United States Patent
Ledingham et al.

(10) Patent No.: US 10,021,239 B2
(45) Date of Patent: Jul. 10, 2018

(54) IN HOME TRANSITION FOR DATA AND POWER MANAGEMENT OF PERSONAL EMERGENCY RESPONSE SYSTEM (PERS) DEVICE

(71) Applicant: KONINKLIJKE PHILIPS N.V., Eindhoven (NL)

(72) Inventors: Stephen Ledingham, Murrysville, PA (US); Tomas Russ, Murrysville, PA (US); Jeff Li, Murrysville, PA (US); Pavan Reddy, Murrysville, PA (US); Alan Brav, Murrysville, PA (US); Bin Wu, Murrysville, PA (US); Jinyan Li, Framingham, MA (US); Brian Gallagher, Framingham, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/862,511

(22) Filed: Sep. 23, 2015

(65) Prior Publication Data
US 2016/0094966 A1 Mar. 31, 2016

Related U.S. Application Data

(60) Provisional application No. 62/055,308, filed on Sep. 25, 2014, provisional application No. 62/055,329, (Continued)

(51) Int. Cl.
*H04W 4/22* (2009.01)
*H04M 1/725* (2006.01)
(Continued)

(52) U.S. Cl.
CPC ........ *H04M 1/72541* (2013.01); *G01S 19/01* (2013.01); *H04M 3/54* (2013.01); *H04M 3/56* (2013.01); *H04M 11/04* (2013.01); *H04W 4/005* (2013.01); *H04W 4/02* (2013.01); *H04W 4/021* (2013.01); *H04W 4/04* (2013.01); *H04W 4/22* (2013.01); *H04W 4/70* (2018.02);
(Continued)

(58) Field of Classification Search
CPC ........ H04W 4/22; H04W 52/02; H04M 11/04
See application file for complete search history.

(56) References Cited

U.S. PATENT DOCUMENTS

| 6,725,044 B2 | 4/2004 | Verma et al. |
| 8,866,606 B1 | 10/2014 | Will et al. |

(Continued)

*Primary Examiner* — Myron K Wyche

(57) ABSTRACT

A Personal Emergency Response System (PERS) includes a call device (10) with a call button (12), LAN (20), WAN (22), and locator service(s) (26, 42). The PERS further includes a hub or gateway device (30). The call device is programmed to periodically send transmissions to the hub or gateway device using the LAN, recognize based on the transmissions that the call device is no longer in a home geo-fence, and transition to communicating using the WAN in response to recognizing that the call device is no longer in the home geo-fence. The transition also includes turning on the locator service(s). The call button triggers the call device to contact the hub or gateway device using the LAN, or a PERS call center when using the WAN. A speaker (14) and microphone (16) are built into the call device for use when communicating using the WAN.

22 Claims, 2 Drawing Sheets

Related U.S. Application Data filed on Sep. 25, 2014, provisional application No. 62/055,279, filed on Sep. 25, 2014, provisional application No. 62/055,351, filed on Sep. 25, 2014.

(51) Int. Cl.

| | | |
|---|---|---|
| *H04W 24/04* | (2009.01) | |
| *H04W 4/70* | (2018.01) | |
| *H04W 4/90* | (2018.01) | |
| *H04W 76/50* | (2018.01) | |
| *G01S 19/01* | (2010.01) | |
| *H04W 4/04* | (2009.01) | |
| *H04W 76/00* | (2018.01) | |
| *H04W 4/021* | (2018.01) | |
| *H04W 52/02* | (2009.01) | |
| *H04M 3/54* | (2006.01) | |
| *H04M 3/56* | (2006.01) | |
| *H04W 4/00* | (2018.01) | |
| *H04W 4/02* | (2018.01) | |
| *H04M 11/04* | (2006.01) | |
| *H04W 84/04* | (2009.01) | |
| *H04W 84/12* | (2009.01) | |
| *H04W 88/06* | (2009.01) | |

(52) U.S. Cl.
CPC .............. *H04W 4/90* (2018.02); *H04W 24/04* (2013.01); *H04W 52/0241* (2013.01); *H04W 76/007* (2013.01); *H04W 76/50* (2018.02); *H04M 2242/04* (2013.01); *H04W 84/042* (2013.01); *H04W 84/12* (2013.01); *H04W 88/06* (2013.01); *Y02B 60/50* (2013.01); *Y02D 70/00* (2018.01)

(56) References Cited

U.S. PATENT DOCUMENTS

| | | | |
|---|---|---|---|
| 2009/0143047 A1* | 6/2009 | Hays | H04M 11/04 |
| | | | 455/404.2 |
| 2009/0157835 A1 | 6/2009 | Thompson et al. | |
| 2009/0289844 A1 | 11/2009 | Palsgrove et al. | |
| 2011/0059719 A1 | 3/2011 | Spielvogel et al. | |
| 2011/0092237 A1 | 4/2011 | Kato et al. | |
| 2013/0076510 A1 | 3/2013 | Bear et al. | |
| 2013/0137450 A1 | 5/2013 | Dai et al. | |
| 2013/0143519 A1 | 6/2013 | Doezema | |
| 2013/0311554 A1 | 11/2013 | Mahajan | |
| 2014/0062695 A1 | 3/2014 | Rosen et al. | |
| 2014/0142934 A1 | 5/2014 | Kim | |
| 2014/0189001 A1 | 7/2014 | Tyagi et al. | |
| 2014/0206307 A1 | 7/2014 | Maurer et al. | |
| 2014/0274225 A1* | 9/2014 | Lacatus | H04W 24/08 |
| | | | 455/574 |
| 2015/0254967 A1 | 9/2015 | Hyatt | |
| 2016/0093197 A1 | 3/2016 | See et al. | |

* cited by examiner

IN HOME TRANSITION FOR DATA AND POWER MANAGEMENT OF PERSONAL EMERGENCY RESPONSE SYSTEM (PERS) DEVICE

FIELD

The following relates generally to the Personal Emergency Response System (PERS) arts and related arts.

BACKGROUND

A Person Emergency Response System (PERS) enables an elderly person or other person at elevated risk of incapacitating medical emergency or other situation of duress requiring 3rd party intervention to summon help. For example, a PERS may be activated by a person experiencing a debilitating fall, a heart attack, an acute asthma attack or other respiratory emergency, or so forth. The PERS typically includes a transmitter device in the form of a necklace-worn pendant, a bracelet, or the like. By activating the transmitter device, a speakerphone console in the residence is activated, by which the at-risk person is placed into telephonic contact with a PERS call center operator. The PERS operator speaks with the calling person (hereinafter referred to as a PERS "subscriber" as the person subscribes with the PERS service, although any associated costs or fees may be paid by a medical insurance company or other third party), and takes appropriate action such as talking the subscriber through an asthma episode, summoning emergency medical service (EMS), dispatching a local PERS agent, neighbor, or other authorized person to check on the subscriber, or so forth. In providing assistance, the PERS operator has access to a subscriber profile stored on a PERS server, which provides information such as (by way of illustration) name, location, demographic information, a list of the person's known chronic conditions, a list of the person's medications, an identification of the nearest hospital, a list of emergency contacts (spouse, relative, friend), physician information, and so forth.

The PERS architecture typically assumes a homebound subscriber (where "home" may be an individual residence, a group residence, an apartment, an assisted care facility, or so forth). The assumption of a homebound subscriber enables use of lean PERS architecture. For example, in one PERS architecture, the transmitter device includes a low-power, short-range radio transmitter (e.g. operating at 900 MHz in some PERS) and the residential speakerphone console is connected to a telephone landline. Activating the transmitter device generates a radio signal that triggers the speakerphone console to connect with the call center. In this design, the transmitter device is a simple device operating at very low power, and most of the system complexity at the residence end is built into the speakerphone console.

A disadvantage of this PERS architecture is that the PERS is only usable when the subscriber is in his or her residence, or in immediate proximity thereto.

The following discloses a new and improved systems and methods that address the above referenced issues, and others.

SUMMARY

In one disclosed aspect, a call device is disclosed for use with a Personal Emergency Response System (PERS) comprising a hub or gateway device. The call device comprises a LAN radio and a WAN radio. The call device is programmed to periodically send transmissions to the hub or gateway device using the LAN radio, recognize based on the transmissions that the call device is no longer in a home geo-fence, and transition to communicating using the WAN radio in response to recognizing that the call device is no longer in the home geo-fence. The call device may further include a call button whose activation triggers the call device to contact (i) the hub or gateway device when communicating using the LAN radio, and a PERS call center when communicating using the WAN radio. A speaker and microphone may be built into the call device and used for conversation with the PERS call center when communicating using the WAN radio. The built-in speaker and microphone are typically not used for conversation with the PERS call center when communicating using the LAN radio (rather, the hub or gateway device comprises a speakerphone for this purpose). For ease of use when in medical distress, the call device may in some embodiments include no other user control besides the call button. The call device may further include one or more locator services configured to acquire a current location of the call device, and the call device is programmed to turn the one or more locator services on as part of the transition to communicating using the WAN radio.

In another disclosed aspect, a call device is disclosed for use in conjunction with a PERS comprising a hub or gateway device. The call device includes a call button, a local area network (LAN) radio configured to communicate with the hub or gateway device, a wide area network (WAN) radio configured to communicate with a cellular network, and an electronic processor programmed to: send a check-in transmission to the hub or gateway device using the LAN radio; in response to a successful check in transmission, switch to operating or continue operating the call device in a home/geo-fence mode in which the WAN radio is off; in response to a failed check in transmission, switch to operating or continue operating the call device in an out-of-home mode in which the WAN radio is on; and respond to activation of the call button by (i) contacting the hub or gateway device using the LAN radio when operating in the home/geo-fence mode and (ii) contacting a PERS call center using the WAN radio when operating in the out-of-home mode.

In some embodiments in accord with the immediately preceding paragraph, the call button further includes one or more locator services, and the electronic processor is programmed to: in response to a successful check in transmission, switch to operating or continue operating the call device in a home/geo-fence mode in which the WAN radio is off and the one or more locator services are off; in response to a failed check in transmission, switch to operating or continue operating the call device in an out-of-home mode in which the WAN radio is on and/or the one or more locator services are on; acquire a current location using the one or more locator services when operating in the out-of-home mode but not when operating in the home/geo-fence mode; and respond to activation of the call button by (i) contacting the hub or gateway device using the LAN radio when operating in the home/geo-fence mode and (ii) contacting a PERS call center using the WAN radio when operating in the out-of-home mode and communicating the current location to the PERS call center using the WAN radio.

In another disclosed aspect, a method is disclosed of maintaining a communication path from a patient-worn call device to a Personal Emergency Response System (PERS). The method includes: periodically sending transmissions from the call device to a PERS hub or gateway device using a LAN radio of the call device; recognizing based on the transmissions that the call device is no longer in a home geo-fence; and turning on a WAN radio of the call device in response to recognizing that the call device is no longer in the home geo-fence. The method may further include turning on one or more locator services of the call device in response to recognizing that the call device is no longer in the home geo-fence, and acquiring a current location of the call device using the turned on one or more locator services. The method may still further include turning off the WAN radio and the one or more locator services of the call device in response to successful sending of transmissions from the call device to the PERS hub or gateway device using the LAN radio of the call device.

One advantage resides in facilitating a PERS architecture that provides full PERS service both in the residence and outside of the residence.

Another advantage resides in providing an energy-efficient call button and a consequently extended time interval between battery recharging.

Another advantage resides in providing a PERS architecture with seamless transition between an energy efficient home/geo-fence operational mode and an out-of-home mode that draws more power.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

In illustrative Personal Emergency Response System (PERS) embodiments described herein, the person served by the PERS service is referred to as a "subscriber". This recognizes that the at-risk person subscribes with the PERS service so that the subscriber's call button device or other PERS hardware are associated with the PERS service and appropriate subscriber data are stored at the PERS server. It is to be understood that the term "subscriber" has no further connotation—for example, any costs or fees associated with the PERS subscription of the subscriber may be paid by the subscriber, or by a medical insurance company, or by a governmental agency, or by some other third party.

Terminology such as "home" or "residence" or "geo-fence location" merely connotes the location where the PERS hub or gateway device is installed. The home or residence may, by way of non-limiting example, be an individual residence, a group residence, an apartment, an assisted care facility, or so forth.

Figure 1:
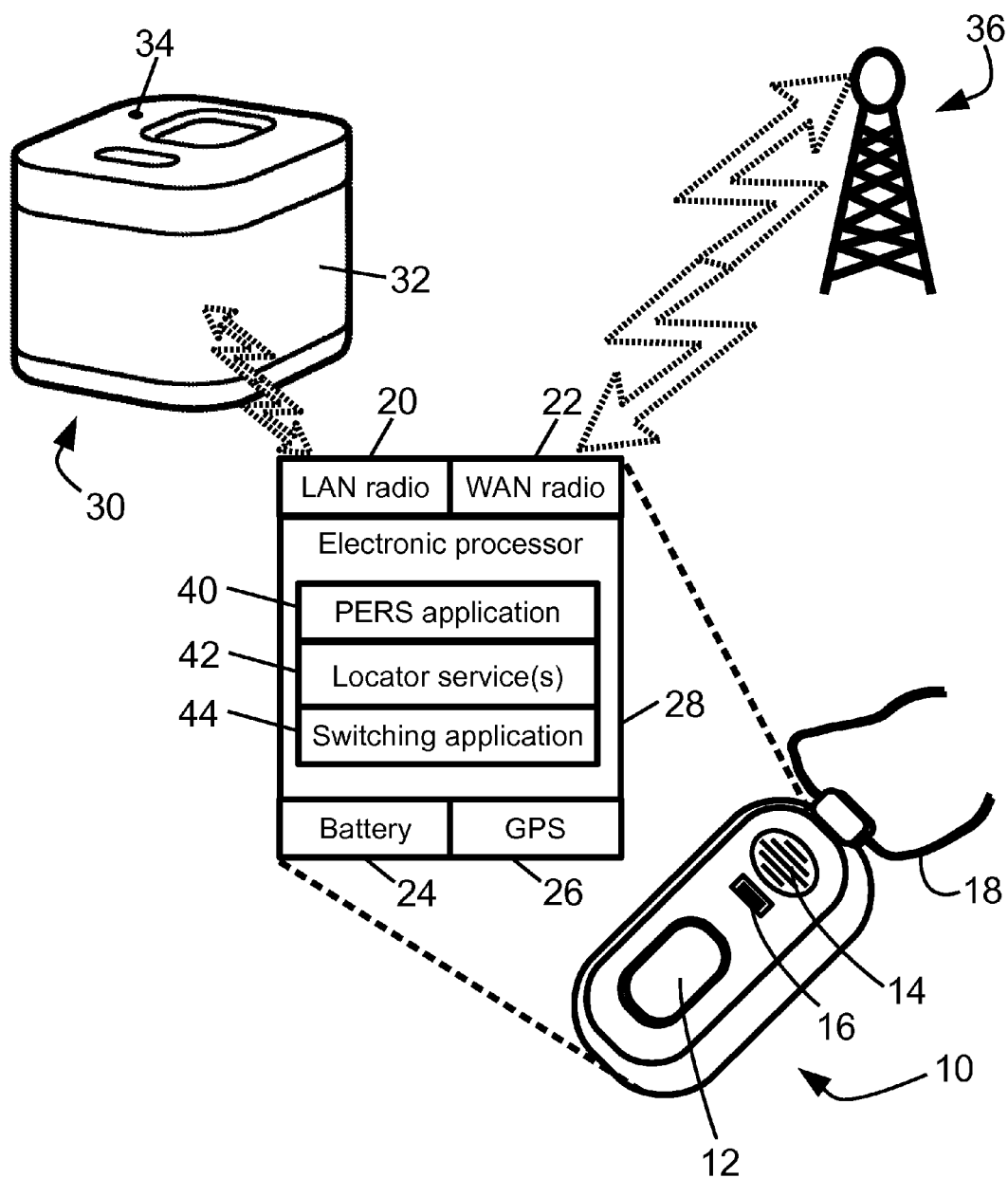
FIG. 1 diagrammatically illustrates a Personal Emergency Response System (PERS) architecture providing PERS service both in the residence and when the subscriber is away from the residence.

With reference to FIG. 1, an illustrative PERS service infrastructure providing PERS service both in the subscriber residence and when the subscriber is away from the residence is described. The subscriber carries or wears a wearable call device 10 which includes a call button 12, a speaker 14, and a microphone 16. The illustrative wearable call device 10 is a pendant that is worn around the neck via a necklace 18 (shown in part). More generally, the wearable call device is a unitary device that can have any suitable wearable form factor, such as the illustrative necklace-worn pendant, or a bracelet or wristband mount, or so forth, and includes simple and effective mechanism such as the illustrative push button 12 for triggering a call to a PERS call center. The call device 10 is suitably battery-powered to enable complete portability. While the illustrative (preferably large) push button 12 is a convenient call trigger mechanism, other call trigger mechanisms are contemplated, such as a voice-activated trigger mechanism. It is also contemplated to provide a wearable call device that automatically triggers a call based on certain input. For example, the wearable call device 10 may include an accelerometer and/or other type of sensor (not shown), and the call device 10 triggers a call upon the sensor(s) detecting a rapid downward acceleration indicative of a sudden fall event. The wearable call device 10 optionally has other attributes such as optionally being waterproof so it can be worn in a bath or shower. Because the call device 10 is designed to be operated by the subscriber under duress possibly including compromised physical or mental agility, the call device 10 is preferably designed to minimize operational complexity and likelihood of operator error. For example, in some embodiments the call device 10 includes only the call button 12 and no other user controls, and the call button 12 is preferably large with a tactile surface to facilitate its activation by the subscriber even if the subscriber's hand is trembling or the subscriber has vision difficulty, pain, or is otherwise debilitated.

FIG. 1 diagrammatically illustrates internal components of the PERS call device 10, including a Local Area Network (LAN) radio 20, a Wide Area Network (WAN) radio 22, a battery 24, a Global Positioning System (GPS) unit 26, and an electronic processor 28 (e.g. a microprocessor or microcontroller). It will be appreciated that these various components may be variously integrally formed and/or mounted separately or as combined units in the housing of the call device 10. For example, various groups of components 20, 22, 26, 28 may be commonly mounted as a hybrid integrated circuit, monolithic integrated circuit, or so forth.

The LAN radio 20 is configured to wirelessly communicate with a PERS hub or gateway device 30 either directly or via an intermediate access point (AP). For example, the LAN radio 20 may communicate via a dedicated 900 MHz link, a 2.4 GHz band, 5 GHz band or other short range wireless link such a WiFi link (possibly including an intermediate AP) or Bluetooth. It is contemplated for the LAN radio 20 to comprise two or more radios operating at different frequencies and/or communication protocols. For example, the LAN radio 20 may include both a 900 MHz radio and a WiFi radio, with the unit being configurable to operate using either 900 MHz or WiFi depending upon the radio in the hub or gateway device 30. The hub or gateway device 30 is located in the residence, and includes a speaker 32 and a microphone 34. Thus, the hub or gateway device 30 comprises a speakerphone console 30 via which a PERS operator can directly speak with the subscriber. To this end, the hub or gateway device 30 employs a reliable communication link to the PERS call center (not shown), such as a landline telephone link (although another type of reliable wired or wireless link is also contemplated, such as a cable television cable link, a wireless link to an Internet AP, or so forth). The LAN radio 20 of the call device 10 and the in-residence PERS hub or gateway device 30 provide the communication architecture via which the subscriber accesses the PERS service when the subscriber is located at the residence (also referred to herein as the geo-fence location).

The WAN radio 22 is configured to wirelessly communicate with a wide-area wireless communication network such as a cellular network, e.g. a cellular telephone (cellphone) network. This is diagrammatically indicated in FIG. 1 as communication between the WAN radio 22 and a cellular network tower 36. The WAN radio 22 of the call device 10 provides PERS service to the subscriber when the subscriber (or more particularly the call device 10) is out-of-range of the in-residence PERS hub or gateway device 30. In this case the PERS call center operator cannot leverage the speaker 32 and microphone 34 of the hub or gateway device 30 to speak with the subscriber; rather, in this "out-of-home" mode the speaker 14 and microphone 16 of the call device 10 is relied upon to support this conversation.

The electronic processor 28 is programmed to execute a PERS application 40, which detects activation of the call button 12 (or detects another emergency call trigger such as an accelerometer signal indicative of a sudden fall) and operates the LAN or WAN radio 20, 22 to transmit information to initiate an emergency call in response to the detected trigger. When using the WAN radio 22, the PERS application 40 also operates the speaker 14 and microphone 16 to conduct conversation between the PERS call center operator and the subscriber. (By contrast, when using the LAN radio 20 this conversation is conducted by the hub or gateway device 30). It is contemplated for the PERS application 40 to perform other functions as appropriate to provide other contemplated PERS services, such as operating the WAN radio 22 to place a call to emergency services (e.g. a 911 call in the United States).

In situations in which the location of the subscriber (or, more precisely, of the call device 10) is needed, this location can be determined by one or more locator services 42 running on the electronic processor 28. The locator app 42 may, for example, determine location based on GPS coordinates provided by the GPS unit 26 or, if insufficient GPS satellite signal is available, location may be determined by another mechanism such as based on the detected cellular network towers (including the tower 36 and any other cellular network towers in range of the WAN radio 22). If the LAN radio 20 employs WiFi then another location service may determine location by detecting WiFi access points in range of the LAN radio 20. Location determination based on in-range cellular network towers and/or in-range WiFi APs suitably uses a global locator service such as Skyhook™ (Boston, Mass., USA) to correlate the detected towers or APs with geographical location. In some embodiments GPS is not used as one of the locator services, in which case the GPS unit 26 is omitted. Location data determined by the locator service(s) 42 are communicated to the call center operator during an emergency call by the PERS application 40 and the operating radio 20, 22.

Figure 2:
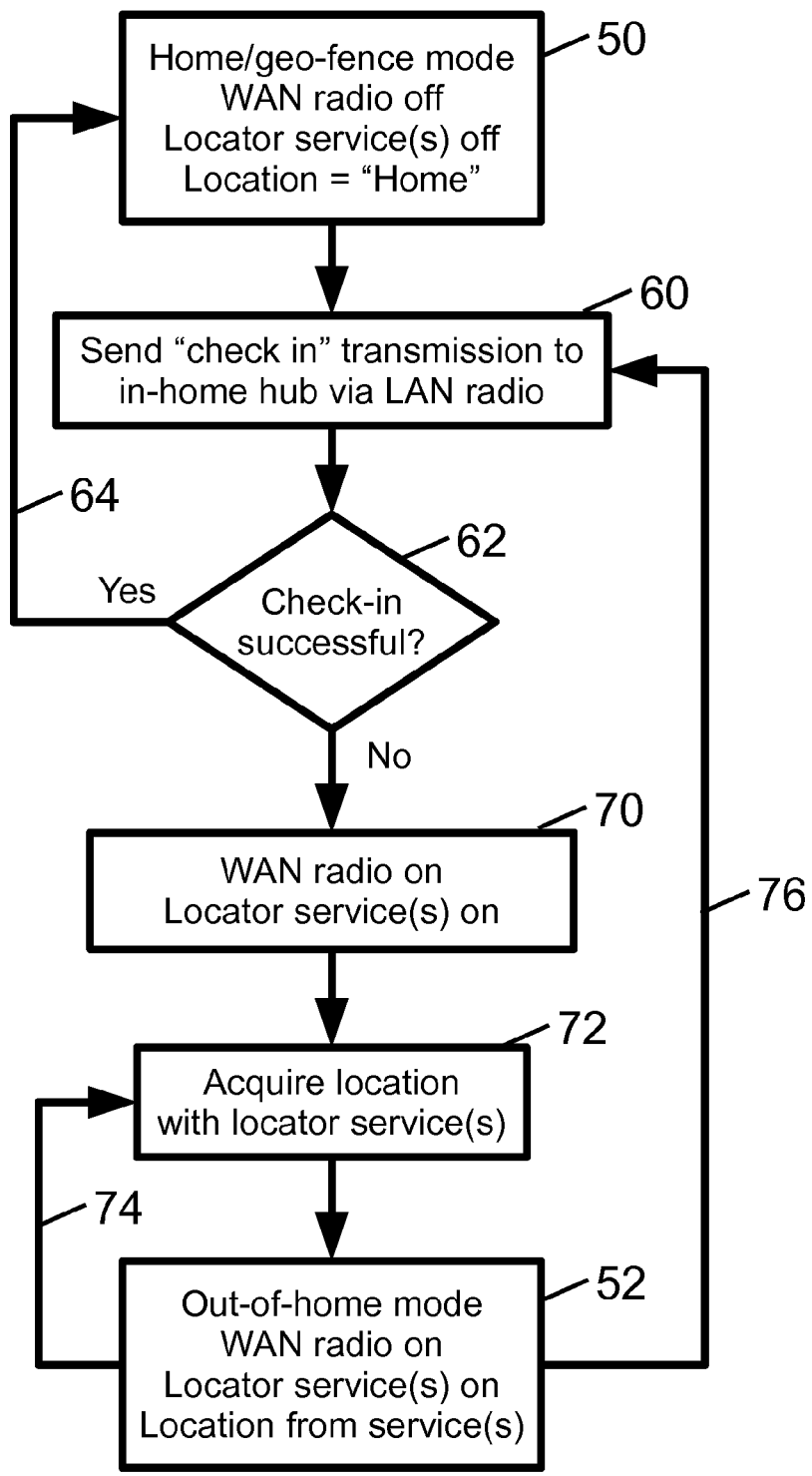
FIG. 2 diagrammatically illustrates an illustrative operation of the switching application of the call button device shown in FIG. 1.

With continuing reference to FIG. 1 and with further reference to FIG. 2, the electronic processor 28 further executes a switching application 44 which switches the call device 10 between a home/geo-fence mode 60 and an out-of-home mode 52. The home/geo-fence mode 50 is used when the subscriber (or, more precisely, the call device 10) is within range of the hub or gateway device 30. In the home/geo-fence mode 50, the WAN radio 22 is turned off to extend battery life. Similarly, in the home/geo-fence mode 50 the locator service(s) 42 are also turned off "Turning off" the locator service(s) 42 includes turning off the GPS unit 26 (if included) and not polling to detect in-range cellular network towers or WiFi APs (if performed as part of the locator services). It will be appreciated that GPS and radio polling are energy-intensive, and thus turning off the locator service(s) again extends battery life.

With continuing reference to FIG. 2, description of the illustrative operation of the switching application 44 starts with the call device 10 in the home/geo-fence mode 60 in which the WAN radio 22 is off and locator service(s) are off. In the home/geo-fence mode 60, the location is the default "Home" location which designates the subscriber's residence. More precisely, the "Home" location is defined as that area within which the call device 10 is in range to communicate with the hub or gateway device 30 installed in the subscriber's residence. To ensure that the call device 10 remains in this range, it periodically performs a "check in" operation 60 in which the call device 10 sends a check-in transmission to the hub or gateway device 30 using the LAN radio 20. In an operation 62 it is determined whether the check-in operation 60 was successful (e.g., as indicated by an acknowledgement transmission received back from the hub or gateway device 30). If at operation 62 it is determined that the check-in operation 60 was successful, then process flow follows loop 64 to remain in the home/geo-fence mode 50. The check-in operation 60 is repeated on an occasional basis, e.g. every 2 minutes in some embodiments although longer or shorter repetitions, or aperiodic repetitions, are also contemplated. If the call device 10 includes an accelerometer or other mechanism for assessing subscriber movement, then the check-in repetitions are optionally performed more frequently when the subscriber is moving and less frequently when the subscriber is stationary. The check-in operation 60 preferably sends a minimalist amount of data in the transmission so as to minimize battery energy consumption.

With continuing reference to FIGS. 1 and 2, if at the operation 62 it is determined that the check-in operation 60 failed, then process flow passes to operation 70 to initiate transition to the out-of-home mode 52. In some embodiments, if the check-in operation 60 fails then the check-in operation 60 may be repeated once, twice, or a few times before the operation 62 finally concludes that check-in has failed (these optional repeated check-ins are not depicted in FIG. 1). When the operation 62 determines that check-in has failed (either as indicated by one failed instance of the check-in operation 60, or in other embodiments as indicated by a designated number of repeated failed instances of the check-in operation 60) then switch-over to the out-of-home mode 52 is initiated in the operation 70 by turning on the WAN radio 22 and the locator service(s) 42 (including turning on the GPS unit 26, if included in the call device 10). In an operation 72 the current location of the subscriber (or, more precisely, of the call device 10) is acquired using the locator service(s) 42. For example, the operation 42 may entail acquiring a GPS location using the GPS unit 26, and/or performing a scan with the WAN radio 22 to generate a table of in-range cellular network towers, and/or performing a scan with the LAN radio 20 to generate a table of in-range APs, and/or connecting with a global locator service such as Skyhook™ via the WAN radio 22 to correlate these GPS, detected towers, and/or detected APs with geographical location. In embodiments in which the LAN radio 20 can operate on WiFi and another frequency/protocol such as 900 MHz, even if the unit is set to communicate with the hub or gateway device 30 is via the non-WiFi channel (e.g. 900 MHz), the WiFi may optionally be turned on separately to perform the AP scan for the purpose of supporting the locator service(s) 42. It is also contemplated to provide a WiFi radio for the sole purpose of scanning for APs in support of the locator service(s) 42, without having the WiFi radio being configurable to communicate with the hub or gateway device 30. With the location acquired, the out-of-home mode 50 is entered with the WAN radio 22 on, locator service(s) 42 on, and the location designated as the current location determined in the operation 72. Thereafter, in process loop 74 the location acquisition operation 72 is repeated on a periodic basis to track the current location of the subscriber (or, more precisely, the location of the call device 10). The process loop 74 may be performed, for example, every 5 minutes in some embodiments, although longer or shorter repetitions, or aperiodic repetitions, are also contemplated. The call device 10 remains in the out-of-home mode 52 during this time.

Additionally while in the out-of-home mode 52, a process loop 76 is occasionally performed to repeat the check-in operation 60 in order to verify that the subscriber (or call device 10) remains out of communication range from the hub or gateway device 30. As long as this check-in operation 60 fails, as determined in the operation 62, the call device 10 stays in the out-of-home mode 52. On the other hand, if at some instance the check-in operation 60 succeeds as determined in the operation 62, then this means the subscriber (or more precisely the call device 10) is back into its home (i.e. geo-fence) range and the call device 10 returns to the home/geo-fence mode 50 in which the WAN radio 22 and locator service(s) 42 (including GPS unit 26 if provided) are turned off.

In illustrative FIG. 2, separate loops 74, 76 are provided for updating the current location (loop 74) and performing check-in (loop 76). Alternatively, if the repeated location update and check-in are synchronized this can be performed as a single loop. For example, the loop 74 can be omitted and when following the check-in loop 76 the location acquisition operation 72 can be performed after each failed check-in.

In another contemplated alternative, if both loops 74, 76 are performed independently then the check-in loop 76 may optionally be performed only if the current location indicates the subscriber may be "close" to the home/geo-fence locale. This approach saves battery power by not performing check-in repetitions when the subscriber's current location is far away from home (so that check-in necessarily must fail).

It should also be noted that it is contemplated to utilize the speaker 14 and microphone 16 of the call button device 10 when operating in the home/geo-fence mode 50 under certain circumstances. For example, the call center may optionally have the ability to establish a call directly with the body-worn transmitter in the home/geo-fence mode 50 in cases when the subscriber is not within sufficient proximity to the hub or gateway device 30 to facilitate intelligible conversation.

It will be appreciated that the choice amongst these variants suitably depends of specific design factors such as the energy cost of the check-in operation 60 versus the energy cost of computing whether the current location is close to home, and on whether the optimal repetition rates of check-in and location update are close enough to synchronize.

To reiterate certain aspects, when attempting to send data and conserve power, the switching application or protocol 44 allows for transition into and out of a home/geo-fence location. The call device 10 then falls into a power saving and data saving mode (i.e. home/geo-fence mode 50) in the home. When transitioning out of the home/geo-fence mode 50, the call device 10 recognizes the transition (operations 60, 62) and moves to a mobile scenario (i.e. out-of-home mode 52). The function of the call device 10 does not change at all during this transition. No features are lost. This protocol provides a way to achieve longer battery life for the call device 10. The call device 10 is able to identify if it currently in home or out of home, as well as determine when the device is transitioned into and out of the home. The call device 10 is advantageously fully functional in both scenarios.

In one specific exemplary embodiment, the switch-over protocol 44 utilizes a proprietary LAN as the LAN radio 20 in the context of the Philips® Lifeline® medical alert service (a commercial PERS provided by Koninklijke Philips N.V., Eindhoven, the Netherlands). When in the home, the switch-over protocol 44 allows for low peak current transmissions to the hub or gateway 30. This improves the battery life of the battery 24. The call device 10 periodically sends transmissions to the gateway 30 as a "Check in", along with the minimalist amount of data in the transmission (operation 60). This allows the system and device to know that it is in the home. Once the call device 10 is outside of the LAN, upon check-in it will recognize that it is no longer in the home and transition to the WAN side of the protocol (operations 70, 72, 74). This then allows the transmission of the device over WAN rather than LAN, which is a higher power consumer and a bigger data packet.

The disclosed approaches are suitably employed in conjunction with home connected devices that transition into and out of the home or a specific location. Such devices suitably utilize the switch-over protocol 44 in order to provide the same services that the call device 10 provides at home, but allows for significant battery saving and reduction in data transfer size. This extends the overall battery life of the call device 10 and improves performance for the subscriber.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A wearable call device for use in conjunction with a Personal Emergency Response System (PERS) comprising a hub or gateway device, the wearable call device comprising:
 a LAN radio; and a WAN radio;
 wherein the wearable call device is configured to be carried or worn by a user and is programmed to:
 periodically send transmissions to the hub or gateway device using the LAN radio; recognize based on the transmissions that the wearable call device is no longer in a home geo-fence; and
 transition to communicating using the WAN radio in response to recognizing that the wearable call device is no longer in the home geo-fence.

2. The wearable call device of claim 1 further comprising:
 a call button whose activation triggers the wearable call device to contact:

the hub or gateway device when communicating using the LAN radio, and a PERS call center when communicating using the WAN radio.

3. The wearable call device of claim 2 further comprising: a speaker and microphone built into the wearable call device and used for conversation with the PERS call center when communicating using the WAN radio.

4. The wearable call device of claim 3 wherein the speaker and microphone built into the wearable call device are not used for conversation with the PERS call center when communicating using the LAN radio.

5. The wearable call device of claim 2 wherein the wearable call device includes no other user control besides the call button.

6. The wearable call device of claim 1 further comprising: one or more locator services configured to acquire a current location of the wearable call device; wherein the wearable call device is programmed to turn the one or more locator services on as part of the transition to communicating using the WAN radio.

7. The wearable call device of claim 6 wherein the wearable call device is programmed to turn on the one or more locator services by operations including at least one of: turning on a GPS unit of the wearable call device; scanning to generate a table of in-range cellular network towers using the WAN radio; and scanning to generate a table of in-range access points (APs) using a WiFi channel of the LAN radio or a WiFi radio of the wearable call device that is separate from the LAN radio.

8. The wearable call device of claim 1 further comprising: a battery powering the wearable call device, wherein the transition to communicating using the WAN radio causes increased power draw from the battery.

9. The wearable call device of claim 1 wherein the WAN radio is configured to communicate with a cellular network.

10. The wearable call device of claim 9 wherein the LAN radio is configured to communicate via a 900 MHz band, 2.4 GHz band, 5 GHz band WiFi or Bluetooth.

11. A wearable call device for use in conjunction with a Personal Emergency Response System (PERS) comprising a hub or gateway device, the wearable call device comprising:
a call button;
a local area network (LAN) radio configured to communicate with the hub or gateway device;
a wide area network (WAN) radio configured to communicate with a cellular network; an electronic processor programmed to:
send a check-in transmission to the hub or gateway device using the LAN radio; in response to a successful check-in transmission, switch to operating or continue operating the wearable call device in a home/geo-fence mode in which the WAN radio is off;
in response to a failed check-in transmission, switch to operating or continue operating the wearable call device in an out-of-home mode in which the WAN radio is on; and respond to activation of the call button by (i) contacting the hub or gateway device using the LAN radio when operating in the home/geo-fence mode and (ii) contacting a PERS call center using the WAN radio when operating in the out-of-home mode.

12. The wearable call device of claim 11 further comprising:
one or more locator services;
wherein the electronic processor programmed to:

in response to a successful check-in transmission, switch to operating or continue operating the wearable call device in a home/geo-fence mode in which the WAN radio is off and the one or more locator services are off;
in response to a failed check-in transmission, switch to operating or continue operating the wearable call device in an out-of-home mode in which the WAN radio is on and the one or more locator services are on;
acquire a current location using the one or more locator services when operating in the out-of-home mode but not when operating in the home/geo-fence mode; and
respond to activation of the call button by (i) contacting the hub or gateway device using the LAN radio when operating in the home/geo-fence mode and (ii) contacting a PERS call center using the WAN radio when operating in the out-of-home mode and communicating the current location to the PERS call center using the WAN radio.

13. The wearable call device of claim 12 wherein the one or more locator services including one or more of:
a GPS unit of the wearable call device;
the WAN radio and the electronic processor cooperating to generate a table of in-range cellular network towers; and
a WiFi radio of the LAN radio or a WiFi radio that is separate from the LAN radio and the electronic processor cooperating to generate a table of in-range access points (AP's).

14. The wearable call device of claim 12 further comprising:
a speaker and a microphone built into the wearable call device;
wherein the electronic processor is programmed to respond to activation of the call button by (i) contacting the hub or gateway device using the LAN radio when operating in the home/geo-fence mode (ii) contacting a PERS call center using the WAN radio when operating in the out-of-home mode and communicating the current location to the PERS call center using the WAN radio and conducting a conversation with the PERS call center using the WAN radio and the speaker and microphone built into the wearable call device.

15. The wearable call device of claim 14 wherein the speaker and microphone built into the wearable call device are not used for conducting a conversation with the PERS call center when operating in the home/geo-fence mode.

16. The wearable call device of claim 11 wherein the wearable call device includes no other user control besides the call button.

17. The wearable call device of claim 11 further comprising:
a battery powering the wearable call device, wherein operating in the out-of-home mode draws more power from the battery than operating in the home/geo-fence mode.

18. A Personal Emergency Response System (PERS) comprising:
a hub or gateway device including a speaker and a microphone; and a wearable call device as set forth in claim 11, wherein the hub or gateway device is configured to connect with the PERS call center in response to being contacted by the wearable call device responding to activation of the call button and to conduct a conversation with the PERS call center using the speaker and microphone of the hub or gateway device.

19. A method of maintaining a communication path from a patient-worn call device to a Personal Emergency Response System (PERS), the method comprising:
periodically sending transmissions from the patient-worn call device to a PERS hub or gateway device using a LAN radio of the patient-worn call device;
recognizing based on the transmissions that the patient-worn call device is no longer in a home geofence; and
turning on a WAN radio of the call device in response to recognizing that the patient-worn call device is no longer in the home geo-fence.

20. The method of claim 19 further comprising:
turning on one or more locator services of the patient-worn call device in response to recognizing that the patient-worn call device is no longer in the home geo-fence; and
acquiring a current location of the patient-worn call device using the turned-on one or more locator services.

21. The method of claim 19 further comprising:
turning off the WAN radio of the patient-worn call device in response to successful sending of transmissions from the patient-worn call device to the PERS hub or gateway device using the LAN radio of the call device.

22. The method of claim 19 further comprising:
turning off the WAN radio and one or more locator services of the patient-worn call device in response to successful sending of transmissions from the patient-worn call device to the PERS hub or gateway device using the LAN radio of the call device.

* * * * *